United States Patent [19]

Smuckler

[11] Patent Number: 5,206,482
[45] Date of Patent: Apr. 27, 1993

[54] SELF REGULATING LAMINAR HEATING DEVICE AND METHOD OF FORMING SAME

[76] Inventor: Jack H. Smuckler, 9 Countryside La., Marblehead, Mass. 01945

[21] Appl. No.: 824,331

[22] Filed: Jan. 23, 1992

Related U.S. Application Data

[63] Continuation-in-part of Ser. No. 610,795, Nov. 8, 1990.

[51] Int. Cl.⁵ .............................................. H05B 3/84
[52] U.S. Cl. .................................. 219/219; 219/553; 219/543; 219/505; 219/548
[58] Field of Search ............... 219/219, 543, 522, 504, 219/505, 548, 549, 552, 553

[56] References Cited

U.S. PATENT DOCUMENTS

| | | |
|---|---|---|
| 2,715,668 | 8/1955 | Booker et al. |
| 3,287,684 | 11/1966 | Armbruster, Jr. ................ 338/211 |
| 3,457,537 | 7/1969 | Hines ................................. 338/162 |
| 3,793,716 | 2/1974 | Smith-Johannsen ............... 29/611 |
| 3,878,362 | 4/1975 | Stinger ............................... 219/528 |
| 4,061,601 | 12/1977 | Clary ................................. 219/219 |
| 4,071,736 | 1/1978 | Kamerling .......................... 219/219 |
| 4,250,398 | 2/1981 | Ellis et al. ......................... 219/345 |
| 4,485,297 | 11/1984 | Grise et al. ........................ 219/528 |
| 4,575,620 | 3/1986 | Ishii .................................. 219/549 |
| 4,658,121 | 4/1987 | Horsma ............................. 219/553 |
| 4,761,541 | 8/1988 | Batliwalla et al. ................. 219/528 |
| 4,775,778 | 10/1988 | van Konynenburg .............. 219/549 |
| 4,777,351 | 10/1988 | Batliwalla et al. ................. 219/528 |
| 4,857,711 | 8/1989 | Watts ................................ 219/548 |
| 4,882,466 | 11/1989 | Friel .................................. 219/219 |
| 5,077,889 | 1/1992 | Matsuda et al. |

OTHER PUBLICATIONS

Bueche, "A New Class Of Switching Materials", *J. Appl. Phys.*, vol. 44, No. 1, Jan. 1973, pp. 532–533.

*Primary Examiner*—Teresa J. Walberg
*Attorney, Agent, or Firm*—Testa, Hurwitz & Thibeault

[57] ABSTRACT

A positive temperature coefficient coating or layer is produced by applying to a substrate a composition containing a dispersion of conductive particles in a solution of a solvate or solvatable crystalline organic polymer. The coating or layer so formed can be incorporated into temperature self-regulating heating devices.

9 Claims, 2 Drawing Sheets

SELF REGULATING LAMINAR HEATING DEVICE AND METHOD OF FORMING SAME

RELATED APPLICATIONS

This application is a continuation-in-part of co-pending U.S. application Ser. No. 07/610,795, filed Nov. 8, 1990, the entire disclosure of which is hereby incorporated herein by reference.

BACKGROUND OF THE INVENTION

The present invention relates to laminar heating devices, and more particularly, to heating devices with temperature self-regulating properties. Laminar heating devices having resistive elements containing conductive carbon or metal powders dispersed in a polymer matrix are well known in the art. For example, U.S. Pat. No. 2,715,668 discloses an electrically conductive film panel heater having a resistive element fabricated from silver flake, antimony oxide, and graphite dispersed in an alkyd resin and xylene. U.S. Pat. No. 3,287,684 discloses an electrical heating device made from a conducting ink of a mixture of polyester resin, graphite and a solvent. U.S. Pat. No. 3,457,537 discloses a flexible resistance element film of a tetrafluoroethylene film coated with a formulation of a phenolic resin, conductive carbon black and acetone. U.S. Pat. No. 3,878,362 discloses an electrical heater having a laminated structure. The resistive element has an insulating polymeric film coated with an electrically conductive elastomeric material containing conductive carbon black dispersed in a heat-resistant elastomer. U.S. Pat. No. 4,071,736 discloses a defrosting mirror made by painting a resistive coating with graphite particles dispersed in a solvated fluoroelastomer polymer onto a primed glass surface.

The polymer component of the foregoing electrically conductive coatings are all non-crystalline or very low in crystallinity. As a consequence, the resulting heaters are constant wattage devices requiring the added expense of a thermostat in order to attain temperature self-regulation and overheat protection.

Non-laminar heating devices which have temperature control, so-called temperature self-regulating heating devices, are well known in the art. Such heating devices include, for example, two discrete, spaced-apart elongated conductor wires joined in physical and electrical contact by an extruded, cross-linked, solid polymer of carbon black particles dispersed in a crystalline polymer matrix. These heating devices are essentially heating cables, and are neither low-cost nor laminar heating devices.

Laminar temperature self-regulating heating devices are disclosed in U.S. Pat. Nos. 4,761,541 and 4,777,351. The resistive element described in these patents is an extruded and irradiation cross-linked thin sheet consisting of carbon black dispersed in a polyvinylidene fluoride polymer. Electrodes are screen printed on one surface of the sheet using commercial conductive ink of silver particles dispersed in a solvated elastomer. This method requires melt-extrusion and irradiation cross-linking, both of which are relatively expensive procedures. U.S. Pat. Nos. 4,761,541 and 4,777,351 disclose the use of crystalline polymers, ethylene/ethyl acrylate copolymer and polyvinylidene fluoride, as components of compositions which exhibit temperature self-regulating properties. Other polymers disclosed are thermoplastic crystalline polymers such as olefin polymers, including homopolymers, particularly polyethylene and polyalkenamers obtained by polymerizing cycloolefins; copolymers of two or more olefins, and copolymers of one or more olefins, e.g., ethylene or propylene, with one or more olefinically unsaturated comonomers, preferable polar comonomers, e.g., vinyl acetate, acrylic acid, methyl acrylate and ethyl acrylate. Also disclosed are fluoropolymers, in particular, polyvinylidene and copolymers of ethylene with tetrafluoroethylene and/or a perfluoro-alkoxy comonomer. While these polymers have properties which enable compositions containing them to be extruded, calendered and molded, they have poor solubility in conventional solvents at ambient temperatures so that it is difficult to formulate solution coatings or inks using them.

As disclosed in U.S. Pat. No. 3,793,716, crystalline polymers can be dissolved in some high boiling solvents at temperatures above the crystalline melt temperature of the polymers. However, such solutions are hazardous and therefore extremely difficult to handle in coating operations.

It is an object of the present invention to provide a low-cost temperature self-regulating composition and a heating element containing the composition using resistive inks printed onto an insulating polymer film, the film being affixable to a temperature-sensitive device for control of the temperature of that device.

SUMMARY OF THE INVENTION

A new positive temperature coefficient composition is disclosed which can be used to form laminar, temperature self-regulating coatings. The composition comprises conductive particles dispersed in a crystalline polymer solution.

In one embodiment of the invention, the positive temperature coefficient composition has a preselected switching temperature and comprises a continuous, single-phase solution of a crystalline polymer having an electrically conductive particulate material dispersed throughout the single phase solution. The polymer preferably comprises greater than ten percent by weight of the single phase solution.

An electrical laminar heating device formed from the present positive temperature coefficient composition is also the subject of the present invention. The laminar heating device comprises a dried coating formed from a composition of electrically conductive particles dispersed in a crystalline polymer matrix. The heating device has two or more electrodes applied in contact with the coating. The electrodes are made from a conductive material, such as silver, and serve to connect the resistive coating to an electrical source. When the temperature falls below the preselected switching temperature, an electric current passes through the electrodes and the coating which comprise the present laminar heating device. The preselected switching temperature is near the crystalline melt temperature of the polymer.

The laminar heating device optionally may include a laminar insulating sheet coupled thereto. In this embodiment, the positive temperature coefficient material is coated onto a insulating substrate and dried, and two or more spaced-apart electrodes are applied to the coating to form the heating device. Alternatively, the electrodes can be applied to the insulating substrate first, and the resistive coating applied over the electrodes.

In a preferred embodiment, the laminar heating device is configured for use on a mirror, for example, in a motor vehicle. In this embodiment, a heated mirror assembly in accordance with the present invention includes a reflective mirror element, and an electrical heating element in thermal communication therewith. The heating element is the present laminar heating device comprising a coating made from the present temperature self-regulating positive temperature coefficient material and two or more spaced-apart electrodes. When the temperature falls below the switching temperature, which is the crystalline melt temperature of the polymer, the polymer becomes crystalline and the coating becomes conductive. A current passes between the electrodes through the coating, thereby heating the mirror assembly When the temperature reaches the switching temperature, the polymer changes its configuration (i.e., "melts") and the resistivity of the coating increases thereby terminating the current flow between the electrodes. Thus once the heating device reaches the preselected switching temperature, the laminar heating device switches off. The preselected switching temperature is determined by the crystalline melt temperature of the polymers used in the composition.

Coatings formed from the present composition can alleviate the weather-sensitive nature of various devices which are exposed to wide temperature differences by heating the device below a certain temperature without the use of a thermocouple or thermostat. The switching temperature can be selected by choosing a polymer or blend of polymers having a crystalline melt temperature in the desired range. These and other objects, benefits, advantages and embodiment of the present invention will be disclosed and more fully understood by reference to the following detailed description in conjunction with the attached drawings.

DETAILED DESCRIPTION OF THE PREFERRED EMBODIMENT

It has now been found that low-cost laminar temperature self-regulating heating devices can be fabricated utilizing a coating having a positive temperature coefficient of resistance. The coating comprises conductive particles disposed in a solvated crystalline polymer. The crystalline polymer is soluble at or near ambient temperature (e.g., in the range of about 60° to 80° F.) in a wide range of readily available organic solvents producing flowable solutions at practical concentrations, that is, above 10% by weight of the solution. The dried coatings exhibit satisfactory cohesive strength, abrasion resistance and adhesion to polymeric substrates such as polyester film.

Figure 1:
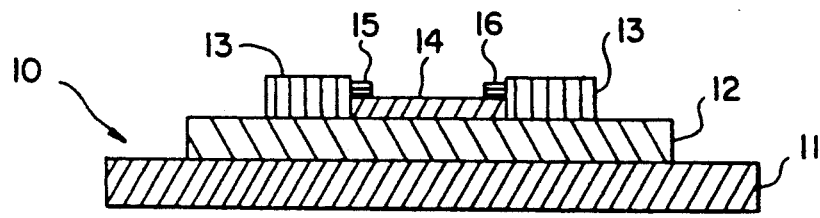
FIG. 1 is a side cross-sectional view of a test specimen for testing positive temperature coefficient coatings.

FIG. 1 shows a cross sectional view of a test specimen 10 for convenient laboratory testing of a positive temperature coefficient coating 14. As shown in FIG. 1, insulating sheet 12 is attached to glass plate 11 by any convenient means. Two ½ inch wide strips of 2 mil thick pressure-sensitive tape 13 are attached to insulating sheet 12, about ½ inch apart. The positive temperature coefficient formulation of choice in liquid form is coated onto sheet 12 by placing the liquid at one end of the space between the two strips of pressure-sensitive tape and drawing down the coating using a razor blade. The formulation is dried to form coating 14. A commercial conductive silver ink (available from Emerson and Cumming, Canton, Mass., a division of W. R. Grace and Company, for example) can be painted along the edges of the ½ inch wide resistive coating and dried to form two silver electrode strips 15 and 16.

The device 10 was tested by the following procedure. Alligator clips were attached to the silver electrodes 15 and 16 and were connected to a Fluke 8050A digital multimeter programmed to measure DC resistance. The device 10 was placed in a laboratory oven at 70 degrees Fahrenheit. The oven was heated slowly to 150 degrees Fahrenheit while resistance readings were recorded every 5 degrees Fahrenheit. The results for several exemplary coating formulations are illustrated in the Examples herein.

Figure 2:
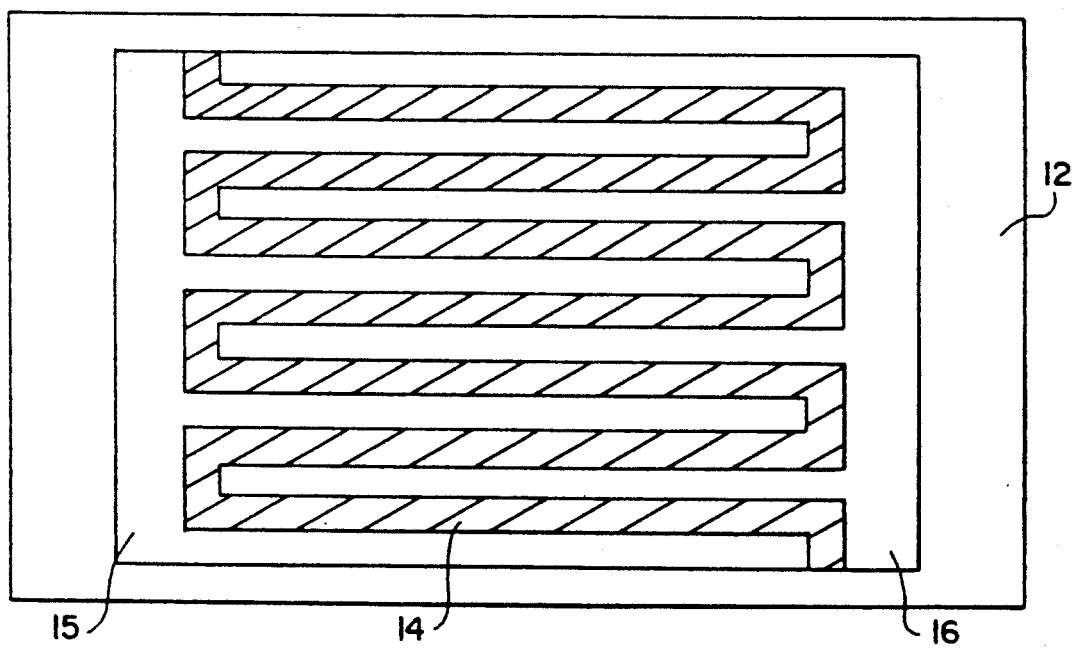
FIG. 2 is a top view of a laminar heating element of the present invention having a plurality of electrode "fingers".

FIG. 2 shows a top view of a laminar heating device of the present invention. The solution of the crystalline polymer containing the dispersed conductive particles is applied to insulating sheet 12 (which can be a Mylar TM sheet, for example) and dried to form coating 14. Electrodes 15 and 16 are then applied onto coating 14 by painting or silkscreening using a silver ink, for example, and the ink is allowed to dry. The embodiment shown in FIG. 2 is a "finger" pattern in which electrode fingers are used to provide more even heating of the device, and to permit the use of a relatively high resistance coating. Alternatively, electrodes 15 and 16 can be applied to insulating sheet 12 before coating 14 is applied. That is, the electrodes can be located on either side of the resistive coating, as long as they are in contact with it.

The resistive composition of the present invention preferably includes conductive particles (such as carbon black) dispersed in a single phase crystalline polymer solution. The resistive composition is applied in liquid form at ambient temperatures to insulating sheet 12 by any suitable coating technique, including, for example, drawing down with a doctor blade or wire wound rod, curtain coating, screen printing, spraying or painting. The resistive composition dries to form a positive temperature coefficient resistive element. Spaced-apart electrodes are applied to the dry resistive element by painting or screen printing, for example. The electrodes then can be connected to a current source (e.g., an automobile battery). A current flowing through the electrodes passes through a portion of the resistive element. The electrodes are preferably formed of silver applied to the resistive element in a "finger" pattern, as shown in FIG. 2.

The resulting laminar heating element has been demonstrated to have the property that when current passes through the electrodes, the resistive element is heated to a temperature which induces a change in the crystalline polymer causing the coating to switch from a high to low conductivity state at a temperature near the crystalline melt temperature of the polymer.

In operation, the polymer coating in the present laminar heating device will be conductive at temperatures below its switching temperature. When the switching temperature is reached, the conductivity changes precipitously to a low conductivity state. The coating is no longer conductive in this state and the current ceases to flow causing the heating to stop. When the coating cools to below the switching temperature, the coating reverts back to a high conductivity state until it again reaches the switching temperature. The device continuously cycles in this manner.

A preferred method for manufacturing the present positive temperature coefficient material involves dissolving a crystalline polymer in a suitable solvent to form a single phase polymer solution, and dispersing electrically conductive particulate material, such as carbon black, into the polymer solution. The single phase solution preferably contains at least 10% by weight of the polymer.

Solvatable crystalline polymers suitable for use in this invention are polymers which are soluble at ambient temperatures in a broad range of organic solvents, such as acetone, methyl ethyl ketone, cyclohexanone, tetrahydrofuran, cellosolve acetate, butylcellosolve acetate, carbitol acetate, and N-methyl pyrrolidone, and solvent blends such as acetone/toluene, acetone/VM&P Naphtha, methyl ethyl ketone/toluene, and methyl ethyl kethone/VM&P Naphtha. The selection of the solvent system will depend in part upon factors such as the method of application of the composition, cost, evaporation rate, flash point and toxicity.

Crystalline polymers preferred for use in this invention are those having a degree of crystallinity of at least 5 percent as determined by X-ray diffraction. Formulations containing polymers with less than about 5 percent crystallinity have little or no positive temperature coefficient of resistance and thus do not produce temperature self-regulating heating devices. Polymers having more than about 5 percent crystallinity produce formulations exhibiting an increased positive temperature coefficient.

Crystalline polymers which are useful in the present composition include crystalline polymers which are solvatable at ambient temperatures, e.g., between about 60° F. and 80° F. Crystalline polyurethane and/or chloroprene polymers, or mixtures thereof, are particularly useful for this purpose. Polyurethane polymers having these characteristics are commercially available under the tradenames Estane TM 5712, 5713, 5716, 5720 and 5730, produced by BF Goodrich Specialty Polymers and Chemicals Division; and Desmocoll TM 400, 510 HV, 530, 530 HV, 540, 540 HV produced by Mobay Corporation. Chloroprene polymers having these characteristics are commercially available under the trade names Neoprene TM AC and AD produced by E. I. DuPont DeNemours, Inc.

Many different kinds of conductive particles can be utilized in the practice of the present invention, including metal powers such as silver, gold, nickel, and powdered graphite. However, carbon black is preferred for this purpose. Carbon blacks can be characterized as "high structure", i.e., having long chains of carbon particles, or "low structure" having shorter chains of carbon particles. High structure carbon blacks generally have greater electrical conductivity than do low structure carbon blacks.

Both high structure and low structure carbon blacks can be used in the present composition. However, carbon blacks which are less conductive (i.e., are low structure carbon blacks) are preferred. The structure of carbon blacks can be measured by their ability to absorb large quantities of oil on their surfaces. A standard test in the industry is absorption of DBP (dibutylphthalate) oil. Absorption is measured by cc's of oil absorbed per 100 grams of carbon black. Conductive, or high structure carbon blacks, such as Cabot Corporation's Vulcan TM XC-72, Vulcan TM SC and Vulcan TM P all have DBP absorptions greater than 100 ccDBF/100 g carbon. Carbon blacks which are preferred in the present composition are those having a DBP absorption of less than 100 cc/100 g carbon black. Preferred carbon blacks include, for example, Monarch TM 120 (Cabot Corporation) which has a DBP absorption of 72 cc/100 g, and Regal TM 300R a DBP absorption of 85 cc/100 g. These carbon blacks, when formulated with solvated crystalline polymers, produce positive temperature coefficient compositions which have improved temperature self-regulating properties compared to similar formulations containing more conductive carbon blacks characterized by a higher DBP absorption.

The amount of carbon black which is dispersed in the present composition can be from about 20 to about 60 percent based on the dry weight of the formulation, preferably from about 40 to 60% by weight. To obtain satisfactory and reproducible results it is important that the conductive powder be well dispersed into the formulation. This is particularly important when the conductive powder is carbon black. The carbon black or other pigment can be dispersed into the present formulation using a ball mill, attritor, high speed impeller mixer, three-roll mill, heavy duty mixer or two-roll mill, for example. Alternatively, carbon black predispersed in organic solvent or in a polymer system can be used. These predispersed products can then be added to the crystalline polymer solution and ingredients in the formulation using low shear mixing equipment.

The electrical heating element may include a laminar insulating sheet. The positive temperature coefficient material is coated onto the insulating sheet and dried to form a laminar resistive heating element. One method of depositing such a coating would be to spray it on in liquid form and allow the solvent to evaporate without exposure to high temperatures. Preferred solvents for this purpose are rapid evaporating solvents such as acetone or methy ethyl ketone. If an oven drying step is used, slower evaporating solvents such as blends of acetone and toluene or acetone and VM&P naphtha can be used.

A preferred method of applying the positive temperature coefficient material to a substrate is by a screen printing method. This method allows the application of a solid or patterned coating. Because open time is required for this method, slow evaporating solvents such as butyl cellosolve acetate, N-methyl pyrrolidone or blends of such solvents are used.

EXAMPLES

The following examples are set forth by way of illustration and not by way of limitation.

Example 1

15 Grams of Estane TM 5712, a crystalline polyurethane polymer produced by B. F. Goodrich having a crystalline melt temperature of about 130° F., was dissolved in a blend of 42 grams of butyl cellosolve acetate and 18 grams of N-methyl pyrrolidone. A homogenous solution was obtained after mechanical mixing for about 3 hours at 160 degrees Fahrenheit. The solution was allowed to cool to room temperature and 20 grams of Monarch TM 120, a fluffy carbon black produced by Cabot Corporation (not usually used in conductive applications), was added slowly while mechanically mixing with a Talboy laboratory electric stirred equipped with a Cowles type mixing blade. A resistive coating for use in laboratory testing was prepared as follows. A 3 inch by 6 inch sheet of insulating film was taped to a glass plate. Two 6 inch long strips of 2 mil thick pressure- sensitive tape were pressed onto the surface of the insulating film in parallel, ½ inch apart. A small quantity of ink at ambient temperature (about 72° F.) was placed at one end of the ½ inch space between the taped and drawn down slowly using a razor blade.

The ink was air dried for 1 hour and then heated for 30 minutes at 230° F. in a laboratory oven. After slow cooling to room temperature, two silver electrode strips, ¼ inch apart, were painted along the ½ inch wide resistive coating using commercial conductive silver ink. The electrodes were air dried for 1 hour, heated to 230 degrees Fahrenheit in a laboratory oven and slowly cooled to room temperature. The test sample was allowed to stabilize overnight. Alligator clips were attached to the two silver electrodes and connected to a Fluke 8050 A digital multimeter programmed to measure DC resistance. The insulating film with alligator clips attached, still taped to a glass plate, was placed in a laboratory oven at 70 degrees Fahrenheit. The oven was heated slowly to 150 degrees Fahrenheit while resistance readings were recorded every 5 degrees Fahrenheit.

At room temperature, the coating had a resistance of 217 ohms and at 150 degrees Fahrenheit, had a resistance of 960 ohms. Its ratio of 150 degree Fahrenheit to room temperature resistance was 4.4. This ratio is a measure of the change in resistance of the coating material over the temperature range from room temperature to 150 degrees Fahrenheit. The larger the ratio, the greater the change in resistance. All other factors being equal, the higher this number, the better the temperature self-regulating properties of the resultant heating element. A ratio of at least 4.0 is preferred.

Example 2

15 grams of Desmacoll TM 540 HV, a crystalline polyurethane polymer produced by Mobay Corporation having a crystalline melt temperature of about 122° F., was dissolved in a blend of 69.3 grams of butyl cellosolve acetate and 29.7 grams of N-methyl pyrrolidone. A homogeneous solution was obtained after mechanical mixing for about 3 hours at 160 degrees Fahrenheit. After cooling to room temperature, 20 grams of Monarch TM 120 was added as in Example 1.

Using the procedure described in Example 1, a coating was prepared and tested. At room temperature, the coating had a resistance of 375 ohms and at 150 degrees Fahrenheit, had a resistance of 5430 ohms. Its ratio of 150 degrees Fahrenheit to room temperature was 14.5.

Example 3

The procedure described in Example 1 was repeated except that Estane TM 5712 was replaced by Neoprene TM AD-10, a crystalline chloroprene polymer produced by DuPont Company having a crystalline melt temperature of about 126° F. At room temperature, the coating had a resistance of 214 ohms; and at 150 degrees Fahrenheit, 1,670 ohms. Its ratio of 150 degrees Fahrenheit to room temperature was 7.8.

Example 4

Using the mixing procedure described in Example 1, 15 grams of Monarch TM 120 was added to a solution of 15 grams of Estane TM 5712 dissolved in 42 grams of butyl cellosolve acetate and 18 grams of N-methyl pyrrolidone. A coating prepared and tested as described in Example 1 had a room temperature resistance of 335 ohms and a 150 degrees Fahrenheit resistance of 8020 ohms. Its ratio of 150 degrees Fahrenheit to room temperature was 23.9.

Example 5

Using the mixing procedure described in Example 1, 10 grams of Monarch TM 120 was added to a solution of 15 grams of Estane TM 5712 dissolved in 31.5 grams of butyl cellosolve acetate and 13.5 grams of N-methyl pyrrolidone. A coating prepared and tested as described in Example 1 had a room temperature resistance of 5140 ohms and a 150 degrees Fahrenheit resistance of 4,740,000 ohms. Its ratio of 150 degrees Fahrenheit to room temperature resistance was 922.

TABLE 1

| Example | % Monarch TM 120 (Dry Weight) | Resistance, Ohms Room Temp | 150° F. | Resistance Ratio |
|---|---|---|---|---|
| 1 | 57.1 | 217 | 960 | 4.4 |
| 4 | 50 | 335 | 8020 | 23.9 |
| 5 | 40 | 5140 | 4,740,000 | 922 |

Table 1 compares the resistance readings and resistance ratios of coatings made from the three inks of Examples 1, 4 and 5 containing three different concentrations of Monarch TM 120. The results show that as the percentage of carbon black increases, the room temperature resistance of the resultant coating decreases. What is not expected is the extraordinary increase in the resistance ratio as the room temperature resistance increases. A high resistance ratio indicates that a heating element would temperature self-regulate quickly over a narrow temperature range. Electrodes for temperature self-regulating heating devices of this invention are preferably formed from a silver coating on the resistance element in a "finger" pattern as shown in FIG. 2. This configuration allows the use of relatively high resistance inks.

Example 6

Using the mixing procedure described in Example 1, 12 grams of Regal TM 300R, a fluffy carbon black product by Cabot Corporation which is not usually used in conductive applications was added to a solution of 15 grams of Estane 5712 dissolved in 42 grams of butyl cellosolve acetate and 18 grams of N-methyl pyrrolidone. A coating prepared and tested as described in Example 1 had a room temperature resistance of 526 ohms and a 150 degree Fahrenheit resistance of 9210 ohms. Its ratio of 150 degrees Fahrenheit to room temperature was 17.5.

Example 7

Using the mixing procedure described in Example 1, 3 grams of Vulcan XC-72R, a fluffy carbon black produced by Cabot Corporation which is often used in conductive applications, was added to a solution of 15 grams of Estane 5712 dissolved in 31.5 grams of butyl cellosolve acetate and 13.5 gram of N-methyl pyrrolidone. A coating prepared and tested as described in Example 1 had a room temperature resistance of 620 ohms and a 150 degree resistance of 2470 ohms. Its ratio of 150 degree Fahrenheit to room temperature resistance was 4.0.

TABLE 2

| Example | Carbon Black | DBP Absorption cc/100 g. | % of Carbon Black (dry weight) | Resistance, ohms Room Temp | Resistance, ohms 150° C. | Resistance Ratio |
|---|---|---|---|---|---|---|
| 4 | Monarch 120 | 72 | 50 | 335 | 8020 | 23.9 |
| 6 | Regal 300R | 85 | 44.4 | 526 | 9210 | 17.5 |
| 7 | Vulcan XC-72R | 188 | 16.7 | 620 | 2470 | 4.0 |

Table 2 compares the resistance readings and resistance ratios of coatings made from three inks (Examples 4, 6, and 7) containing carbon blacks with differing DBP absorptions. The percent carbon black on a dry weight basis was varied with each ink so that the resultant coatings would be close in room temperature resistance. As would be expected, Vulcan XC-72R with high structure as measured by high DBP absorption, a so-called conductive carbon black, required a much lower weight percentage than Monarch 120 and Regal 300R, with low structure as measured by low DPB absorption, and not considered conductive carbon blacks. What is not expected is the significant increase in resistance ratio of the coatings made from inks containing low structure carbon blacks.

Example 8

Using the mixing procedure described in Example 1, 10 grams of Monarch 120 and 5 grams of KS-15 Graphite, a powdered graphite produced by Lonza, Inc. were added to a solution of 15 grams of Estane 5712 dissolved in 31.5 grams of butyl cellosolve acetate and 13.5 grams of N-methyl pyrrolidone. A coating prepared and tested as described in Example 1 had a room temperature resistance of 564 ohms and a 150 degree Fahrenheit resistance of 7640 ohms. Its ratio of 150 degrees Fahrenheit to room temperature resistance was 13.5.

Example 9

Using the mixing procedure described in Example 1, 10 grams of Monarch 120 and 3.5 grams of KS-15 Graphite were added to a solution of 15 grams of Estane 5712 dissolved in 31.5 grams of butyl cellosolve acetate and 13.5 grams of N-methyl pyrrolidone. A coating prepared and tested as described in Example 1 had a room temperature resistance of 723 ohms and a 150 degree Fahrenheit resistance of 36,900 ohms. Its ratio of 150 degree Fahrenheit to room temperature resistance was 51.0.

Figure 3:
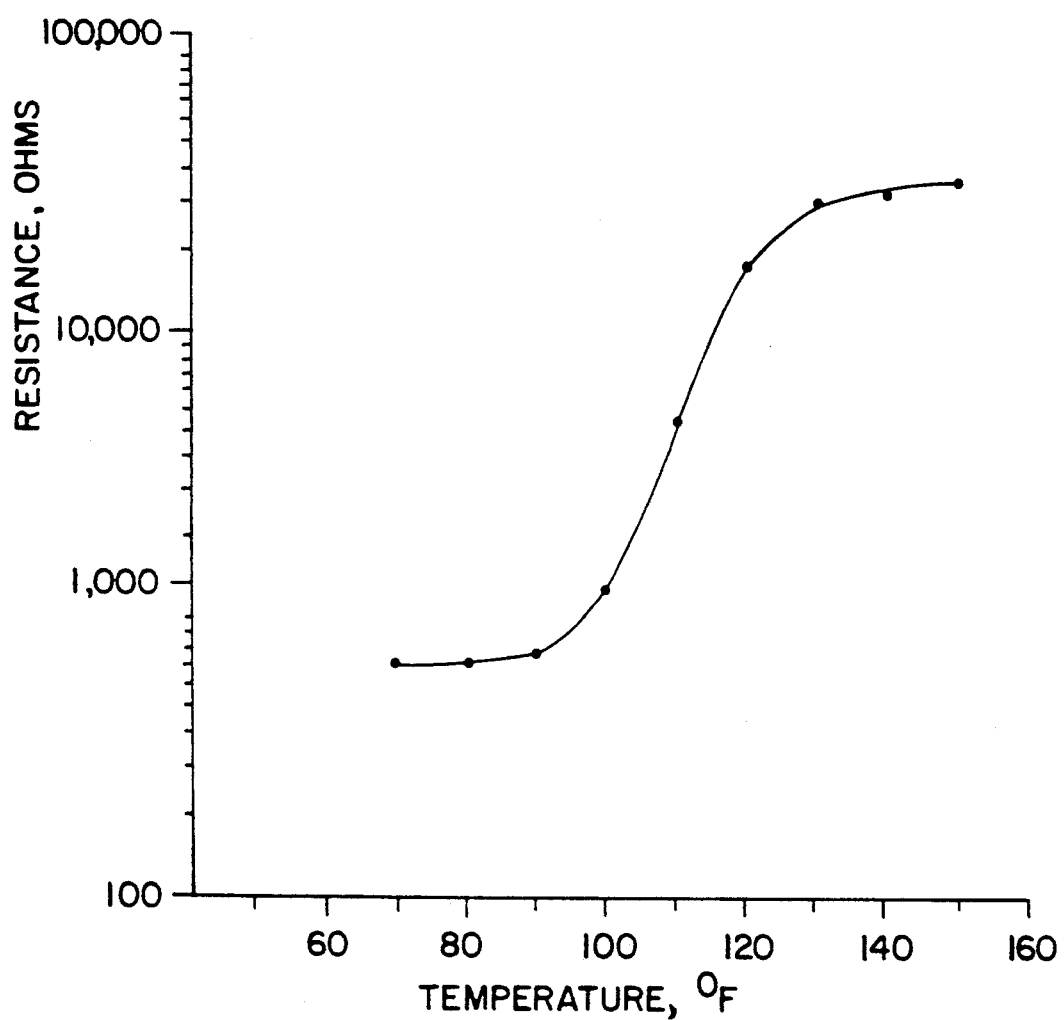
FIG. 3 is a graph showing the relationship between resistance and temperature of a typical coating made in accordance with the invention.

The resistance readings obtained when testing Example 9 as described in Example 1 are shown in graphical form in FIG. 3. Upon external heating the coating rises slowly in resistance from 70° to 90° F., after which a rapid rise occurs between 90° and 130° F. followed by a slow rise to 150° F.

Equivalents

One skilled in the art will be able to ascertain, using no more than routine experimentation, many equivalents to the specific embodiments described herein. Such equivalents are intended to be covered by the following claims.

I claim:

1. A heated mirror assemble comprising:
   a. a reflective mirror;
   b. a temperature self-regulating positive temperature coefficient material in thermal communication with said mirror, said material formed by applying to a non-reflective side of the mirror a composition comprising a dispersion of electrically conductive particulate material in a solution of a crystalline polyurethane or crystalline polychloroprene polymer comprising at least 10% by weight of the polymer, which solution is stable at a temperature in the range of from about 60° F. to about 80° F.; and
   c. a plurality of electrodes disposed in contact with said positive temperature coefficient material spaced apart at a distance to permit current flow between the electrodes through the material at a temperature below its switching temperature.

2. The mirror assembly of claim 1 wherein the electrical heating element further comprises a laminar insulating sheet disposed between the positive temperature coefficient material and the mirror.

3. The mirror assembly of claim 1 wherein the electrically conductive particulate material comprises carbon black.

4. The mirror assembly of claim 1 further comprising a housing for attachment of the mirror assembly to a motor vehicle.

5. A temperature self-regulating laminar heating device comprising (i) a dried resistive coating disposed on a laminar insulating sheet, wherein the coating is formed by applying to the insulating sheet a composition comprising a dispersion of conductive particles in a solution of a crystalline polyurethane or crystalline polychloroprene polymer comprising at least 10% by weight of the polymer, which solution is stable at a temperature in the range of from about 60° F. to about 80° F.; and (ii) two or more spaced apart electrodes disposed in contact with the dried resistive coating.

6. The laminar heating device of claim 5 wherein the crystalline polymer has a degree of crystallinity of at least 5% as determined by x-ray diffraction.

7. The laminar heating device of claim 5 wherein the conductive particles are carbon black.

8. The laminar heating device of claim 5 wherein the conductive particles are a blend of carbon black and graphite.

9. The resistive coating of claim 7 wherein the conductive particles comprise low structure carbon black particles having a DBP absorption of less than 100 cc/100 g of carbon black.

* * * * *